United States Patent
Reulein et al.

(10) Patent No.: US 7,035,837 B2
(45) Date of Patent: Apr. 25, 2006

(54) DOCUMENT COMPONENT MANAGEMENT AND PUBLISHING SYSTEM

(75) Inventors: William B. Reulein, Fairfax Station, VA (US); Walter W. Gioscia, Broken Arrow, OK (US)

(73) Assignee: BenefitNation, Dulles, VA (US)

( * ) Notice: Subject to any disclaimer, the term of this patent is extended or adjusted under 35 U.S.C. 154(b) by 267 days.

(21) Appl. No.: 10/059,024

(22) Filed: Jan. 30, 2002

(65) Prior Publication Data

US 2003/0144982 A1 Jul. 31, 2003

(51) Int. Cl.
G06F 17/30 (2006.01)
G06F 7/10 (2006.01)

(52) U.S. Cl. ............... 707/1; 707/103; 707/10
(58) Field of Classification Search ................ 707/1, 707/3, 100, 513, 10, 103
See application file for complete search history.

(56) References Cited

U.S. PATENT DOCUMENTS

| | | | |
|---|---|---|---|
| 5,721,906 A | 2/1998 | Siefert | |
| 5,860,074 A | 1/1999 | Rowe et al. | |
| 5,887,171 A * | 3/1999 | Tada et al. | 719/317 |
| 5,956,736 A * | 9/1999 | Hanson et al. | 715/513 |
| 5,991,709 A * | 11/1999 | Schoen | 704/1 |
| 6,006,242 A * | 12/1999 | Poole et al. | 715/531 |
| 6,225,998 B1 | 5/2001 | Okita et al. | |
| 6,226,675 B1 * | 5/2001 | Meltzer et al. | 709/223 |
| 6,263,332 B1 * | 7/2001 | Nasr et al. | 707/5 |
| 6,289,460 B1 * | 9/2001 | Hajmiragha | 713/200 |
| 6,360,236 B1 | 3/2002 | Khan et al. | |
| 6,589,292 B1 | 7/2003 | Langford-Wilson | |
| 6,643,663 B1 | 11/2003 | Dabney et al. | |
| 2001/0034739 A1 * | 10/2001 | Anecki et al. | 707/500 |
| 2001/0051906 A1 * | 12/2001 | Esposito | 705/35 |
| 2004/0205644 A1 * | 10/2004 | Shaughnessy et al. | 715/530 |

OTHER PUBLICATIONS

Software AG the XML Company, "Native XML vs. XML-enabled", copyright 2001 Sofware AG USA.*
Software AG the XML Company, "Native XML vs. XLM-enabled", copyright software AG USA.*

* cited by examiner

Primary Examiner—Frantz Coby
Assistant Examiner—Cindy Nguyen
(74) Attorney, Agent, or Firm—Morrison & Foerster LLP

(57) ABSTRACT

A document component management system for automatically generating customized documents for a number of individuals or entities based upon rules. Each customized document is customized for one of the individuals or entities based upon the applicable set of business rules. Users interface with the document component management system through a presentation layer. A data layer contains repositories for document components and published documents in one or more formats. An application layer interfaces the presentation layer with the data layer to create and maintain document components. User requests entered at the presentation layer are fulfilled by the application layer, which automatically retrieves document components, assembles documents in response to user requests and publishes assembled documents to the individuals. A copy of published documents are stored in the data layer.

11 Claims, 8 Drawing Sheets

Figure (3)

| Rule ID | Rule Type | Doc Type | Layer1 | Layer2 | Layer3 | Layer4 | Layer5 | Layer6 | Layer7 | Layer8 | Always True | Else | Next Rule | Prev. Rule | First Rule |
|---|---|---|---|---|---|---|---|---|---|---|---|---|---|---|---|
| 100 | Base-Doc | COC | Null | Null | Null | Null | Null | Null | Null | Null | X | | | | X |
| 200 | Comp-Select | COC | HMO | VA | BNI | Null | Null | Null | Null | Null | X | | 201 | | X |
| 201 | Comp-Select | COC | HMO | VA | BNI | Null | Null | Null | Null | Null | X | | 202 | 200 | X |
| 202 | Comp-Select | COC | HMO | VA | BNI | Null | Null | Null | Null | Null | | 205 | | 201 | |
| 205 | Comp-Select | COC | HMO | VA | BNI | Null | Null | Null | Null | Null | X | | | | |
| 301 | Vartext-Select | COC | HMO | VA | BNI | Null | Null | Null | Null | Null | X | | 305 | | X |
| 305 | Vartext-Select | COC | HMO | VA | BNI | Null | Null | Null | Null | Null | | 306 | | 301 | |
| 306 | Vartext-Select | COC | HMO | VA | BNI | Null | Null | Null | Null | Null | X | | 308 | | |
| 308 | Vartext-Select | COC | HMO | VA | BNI | Null | Null | Null | Null | Null | | 310 | | 306 | |
| 310 | Vartext-Select | COC | HMO | VA | BNI | Null | Null | Null | Null | Null | X | | | 308 | |

Figure 6A

| Condition ID | Rule ID | Condition Type | Variable | Operator | Value | Sub-Condition | Next Condition | First Condition |
|---|---|---|---|---|---|---|---|---|
| 8211 | 202 | Or | | | | 8212 | 8213 | X |
| 8212 | 202 | And | Group | = | BNI | | 8214 | |
| 8214 | 202 | | State | = | VA | | | |
| 8213 | 202 | And | Group | = | BNI | | 8215 | |
| 8215 | 202 | | State | = | MD | | | |
| 9235 | 305 | Or | | | | 9236 | 9238 | X |
| 9236 | 305 | And | Group | = | DMR | | 9237 | |
| 9237 | 305 | | Group | = | BNI | | | |
| 9238 | 305 | And | State | = | VA | | 9242 | |
| 9242 | 308 | or | State | = | VA | | 9244 | X |
| 9244 | 308 | | State | = | PA | | | |

Figure 6B

| | Action ID | Rule ID | Actions | Affected Component | New Component | Next Action | First Action |
|---|---|---|---|---|---|---|---|
| 346 | 56334 | 100 | Insert | | COC-P001 | 56335 | X |
| 348 | 56335 | 100 | Insert | | COC-P002 | 56336 | |
| 350 | 56336 | 100 | Insert | | COC-P003 | 56337 | |
| 352 | 56337 | 100 | Insert | | COC-P004 | 56338 | |
| 354 | 56338 | 100 | Insert | | COC-P005 | | |
| 356 | 56345 | 200 | Replace | COC-P001 | COC.HMO.VA.BNI.P001 | | X |
| | 46743 | 201 | Replace | COC-P002 | COC.HMO.VA.BNI.P002 | | X |
| 356 | 45654 | 202 | Insert | COC-P003 | COC-P003L001 | | X |
| 358 | 45655 | 205 | Insert | COC-P003 | COC-P003L002 | | X |
| 336 | 55256 | 301 | Replace | VT.CompanyName | COC.HMO.VA.BNI.VT0002 | | X |
| 338 | 55258 | 305 | Replace | VT.DoctorType | COC.HMO.VA.BNI.VT0005 | | X |
| 340 | 55262 | 306 | Replace | VT.DoctorType | COC.HMO.VA.BNI.VT0006 | | X |
| 342 | 55264 | 308 | Replace | VT.Dentist | COC.HMO.VA.BNI.VT0008 | | X |
| 344 | 55266 | 310 | Replace | VT.Dentist | COC.HMO.VA.BNI.VT0009 | | X |

Figure 6C

DOCUMENT COMPONENT MANAGEMENT AND PUBLISHING SYSTEM

RELATED APPLICATIONS

An example of a preferred user interface is described in U.S. patent application Ser. No. 10/059,057 entitled "User Interface for a Document Component Management and Publishing System" and U.S. patent application Ser. No. 10/058,817 entitled "Document Rules Data Structure And Method of Document Publication," both to Reulein et al., filed coincident herewith, assigned to the assignee of the present invention, now abandoned.

BACKGROUND OF THE INVENTION

1. Field of the Invention

The present invention is related to document component management and publishing and, more particularly, document components for generating complete individual documents and packages of documents for each of a number of individuals or entities and publishing such documents tailored for each intended individual or entity. The present invention also relates to a workflow controlled authoring and publishing process.

2. Background Description

Enterprises face challenging document management problems in today's publishing environment. The challenges are spread over several areas of creating and publishing a document. These areas include generating personalized (customized) documents for a particular entity or condition, managing document components, (e.g., sections of document text or graphics) that are utilized as a part of hundreds or thousands of different document types within an organization, making certain that output for various media (i.e., paper, CD, Internet, etc.) is consistent with regard to content and styling ("look and feel") for all documents produced by the enterprise and archiving these documents for audit and retrieval purposes.

Generic, or non-personalized/customized, documents can often be generated by assembling base document components or utilizing a base document template for document production. However, for large enterprises or companies working with complicated documents, documents often must be personalized or customized based upon various conditions that may or may not apply to each particular document. Examples of these condition types are state or federal regulations that mandate certain disclosures or statements be contained in specific places (and with specific styling) within a document, differing transaction types that require specialized language, and the insertion of specific data in order to personalize a particular document (e.g., recipient name and address or transaction specific information applicable to that one document).

Many organizations attempt to manage their document production using a series of templates which form the base for each document type that they are required to produce. This often entails a team of employees managing the templates and manually editing each document to personalize or customize them with transaction specific information. In addition, the templates often contain sizeable amounts of text or graphics that are re-used in one or more other documents. This re-used text could be as small as a word or a company logo, or as large as a multi-page section of text. These components are the lowest common denominator of document text for an organization. One of the significant problems with template management is that maintenance of the re-used text throughout the templates is often a burdensome task. When a heavily re-used component needs to be modified, users may be required to search through thousands of document templates in order to find and update all instances of the component. This process is resource intensive and prone to errors.

Consequently, there is a need for a document component management tool that manages document components for document production, rather than managing templates. In addition, there is a need for a system that can personalize and customize documents in an automated fashion based upon client specific business rules free from human intervention and management of the document creation and publishing process, improving document publishing efficiency.

SUMMARY OF THE INVENTION

The present invention is a document component management system for automatically generating customized documents for a number of individuals or entities and the managing of the content for such documents. Each customized document is customized based upon a set of rules. Users interface with the document component management system through a presentation layer. A data layer contains repositories for document components and published documents in one or more formats. An application layer interfaces the presentation layer with the data layer to present data to users via the user interface (presentation layer). User requests entered at the presentation layer are fulfilled by the application layer. A copy of published documents are stored in the data layer.

It is a purpose of the invention to manage component level document production and control the creation and editing process through a workflow process;

It is another purpose of the invention to produce personalized and customized documents in an automated fashion tailored to client specific business rules;

It is yet another purpose of the invention to reduce reliance upon human intervention and knowledge in document creation and publishing, thereby significantly improving document publishing.

BRIEF DESCRIPTION OF THE DRAWINGS

The foregoing and other objects, aspects and advantages will be better understood from the following detailed preferred embodiment description with reference to the drawings, in which:

FIG. 6A shows an example of a Rule Table wherein rules are organized as rows with identifiable variable fields in columns;

FIG. 6B shows an example illustrating a Condition Table;

FIG. 6C is an example of an Action Table.

DESCRIPTION OF THE PREFERRED EMBODIMENTS

Figure 1:
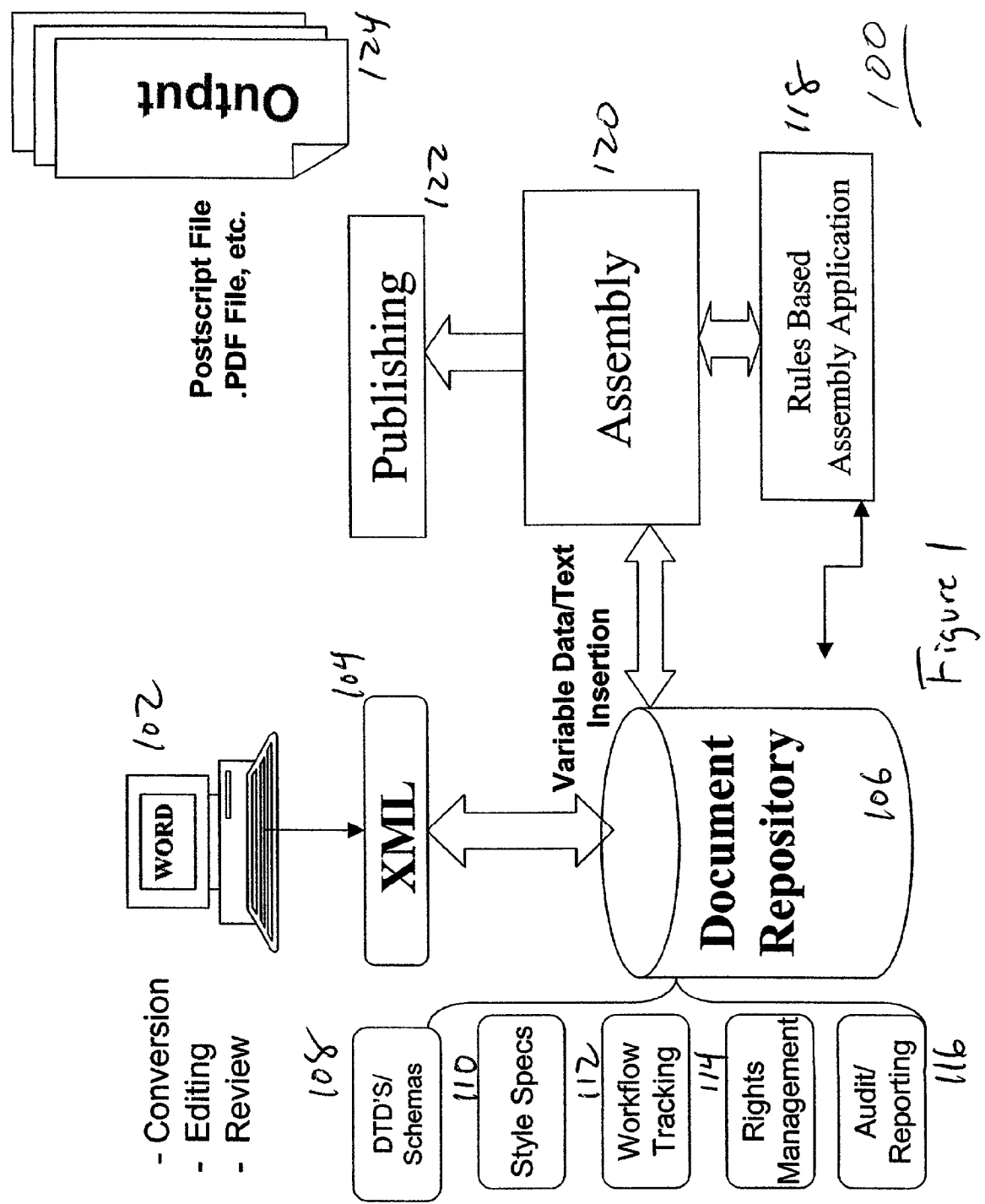
FIG. 1 shows a block diagram of a preferred embodiment document component management system.

Turning now to the drawings and more particularly FIG. 1 shows a block diagram of a preferred embodiment document component management system 100. Users interface with the system 100 through one or more connected terminals, e.g., a personal computer (PC) 102 or the like. A preferred embodiment user interface (UI) or graphical user interface (GUI), accessed from the terminals 102 and interfacing users at the terminals 102 with the rest of the system. Preferably, the User Interface is web browser based, such that each user can access the system through a point to point connection, a virtual private network or over the Internet. An example of a preferred user interface is described in U.S. patent application Ser. No. 10/059,057 entitled "User Interface for A Document Component Management and Publishing System" filed coincident herewith, assigned to the assignee of the present invention. An eXtensible Markup Language (XML) conversion unit 104 converts stored XML components to word processor files for editing by users and also converts edited or new components (e.g., with deletions, insertions, etc.) back into an XML format for storage, production, future edits and other use.

Published documents and XML document components are stored in one or more repositories 106 for subsequent retrieval. The repositories 106 also maintain document type definitions (DTDs) 108, workflow tracking data 112, rights management information 114 and audit/reporting data 116. A rules configuration unit 118 builds rules blocks which contain the instructions necessary to assemble and customize document components into a complete XML document.

Assembly unit 120 executes the rules which are loaded into the configuration unit 118 to assemble the document components and insert and/or remove specific information, such as variable data variable text. The assembly unit 120 passes a copy of each final document to the publishing unit 122 for publication. Publishing unit 122 publishes the completed document as a file 124 in a user specified format (typically an uneditable format) for publication on one or more output media including printed on paper, fixed on a reuseable computer media (e.g., CDROM) or as a web viewable file. It should be noted that subsystem and unit are used interchangeably herein and, are not intended to convey different meanings unless specifically set forth as such.

Users may use the User Interface to request document components or full documents for viewing or editing. Such documents will be presented to users in a word processor or text file. Upon request, the XML conversion subsystem 104 converts either individual components or documents to a file for viewing or editing, e.g., by inserting the file into a selected workflow. Final documents are created by the publishing subsystem 122 and may be published on output media, e.g., printed by a local print facility on a PC as a PDF and/or in hardcopy by a connected printer.

So, authors at a terminal 102 create new document components (e.g., author a new document component or, edit existing component) using a typical state of the art text editor, XML editing tool or word processor, such as Word from Microsoft Corporation. All user interaction with the system 100 including with all subsystems is through the User Interface at a terminal 102. An author/editor passes new or revised components through the User Interface for storage in the repository 106. Authors create new (or modify existing) text components, for example, using their word processing application. The components are then converted preferably into XML, using a suitable XML conversion process. Users interactively pass all system function commands through the UI at a terminal 102. System functions available through the user interface include administration, searching, viewing (documents and components), ordering, workflow, reporting and audit.

The conversion unit 104 converts XML components and documents back and forth between XML and word processor format. When an author selects text, such as a component or document for editing or viewing, the conversion unit 104 converts the selected text to word processor or other viewable format. Client specified formatting instructions guide this conversion. Users may search the repository 106 either for individual XML components or complete documents, which can be assembled into a document upon request by the assembly subsystem 120. The repository 106 also contains an archive of each published document, preferably, in portable document format (PDF). Users can search the repository 106 to view and print these archived documents.

Each DTD or schema 108 is a standard blueprint for the permitted construction of a document. DTDs 108 are used to validate proper assembly and structure of each document prior to publication. Any document that does not conform to the appropriate DTD is not published and evokes an error message. A DTD may be custom developed or industry standard DTDs may be utilized. DTDs are used by XML and SGML parsers to validate proper document construction, which ensures and maintains consistency. For example, a DTD may mandate that a certain section of a document contain a traditional paragraph structure. If a document contains a bulleted list in that section, it will not be validated against the DTD and the system may produce an error message.

Style specifications 110 are used by the publishing unit 122 to establish and maintain document style for published documents. Style specifications specify document print formatting, e.g., font type, bolding, italics, column organization, etc. One or more of the numerous available publication formats may be selected for publication. Documents may be published in a variety of industry standard formats including postscript, PDF, HTML and metacode. Published document files may be output in hard copy, fixed on a CD ROM or placed on a website using hypertext markup language (HTML), XML or the like as selected by the user. Different output formats are styled by different style specifications.

The workflow unit 112 directs the assignment of tasks within each project to applicable users, each user having a specifically assigned role within the given project. It is understood that each user's role may vary from project to project. The preferred embodiment system provides a graphical representation with different colors and boxes depicting the current status of the particular project. Each project workflow is configurable on a client-by-client basis. The rights management unit 114 assigns users with read/write permission, security access and other system-level rights. The audit unit 116 tracks XML components to provide a full audit trail for each component. The audit trail among other things, contains a list of prior versions for each component accompanied by the name of each user making corresponding edits and date information, e.g., the time/date of each edit. Also, the reporting unit 116 reports user productivity capabilities, as well as document ordering and other selected information.

The assembly subsystem or unit 120 assembles XML components into a completed document based on selected Boolean logic rule statements that are themselves assembled from the appropriate business rules. Document assembly is further described in detail hereinbelow with reference to rules assembly. The assembly unit 120 interrogates client specific document assembly rules and applies the rules to specify replacement, deletion or insertion of variable text and variable data, as appropriate. Users may elect automatic insertion of variable data into appropriate fields within documents. Alternately, users may interactively through the UI, enter the data in a variable data screen.

The publishing unit 122 receives complete XML files from the assembly unit 120 and publishes documents from the received XML files in an industry standard format that may include postscript, PDF, HTML and metacode.

Accordingly, the document component management tool and system of the present invention is multi-faceted, allowing authors to create a document as well as components for the document. Those document components are stored in the repository 106 for document assembly. Also, using the system user interface, an author may choose to recall and re-edit a previously stored document components, each of which may be a part of one or more documents. Once the document components are stored in the repository 106, the components may be included in any document generated by a user, simply by ordering the document and providing the necessary variable data to select the components and complete the document. Business rules may also point to kitting and packaging instructions for a particular document. Thus, a better understanding of the operation of each of these preferred embodiment document component management system units and the processes running therein may be better understood with reference to a preferred embodiment application architecture framework.

Figure 2:
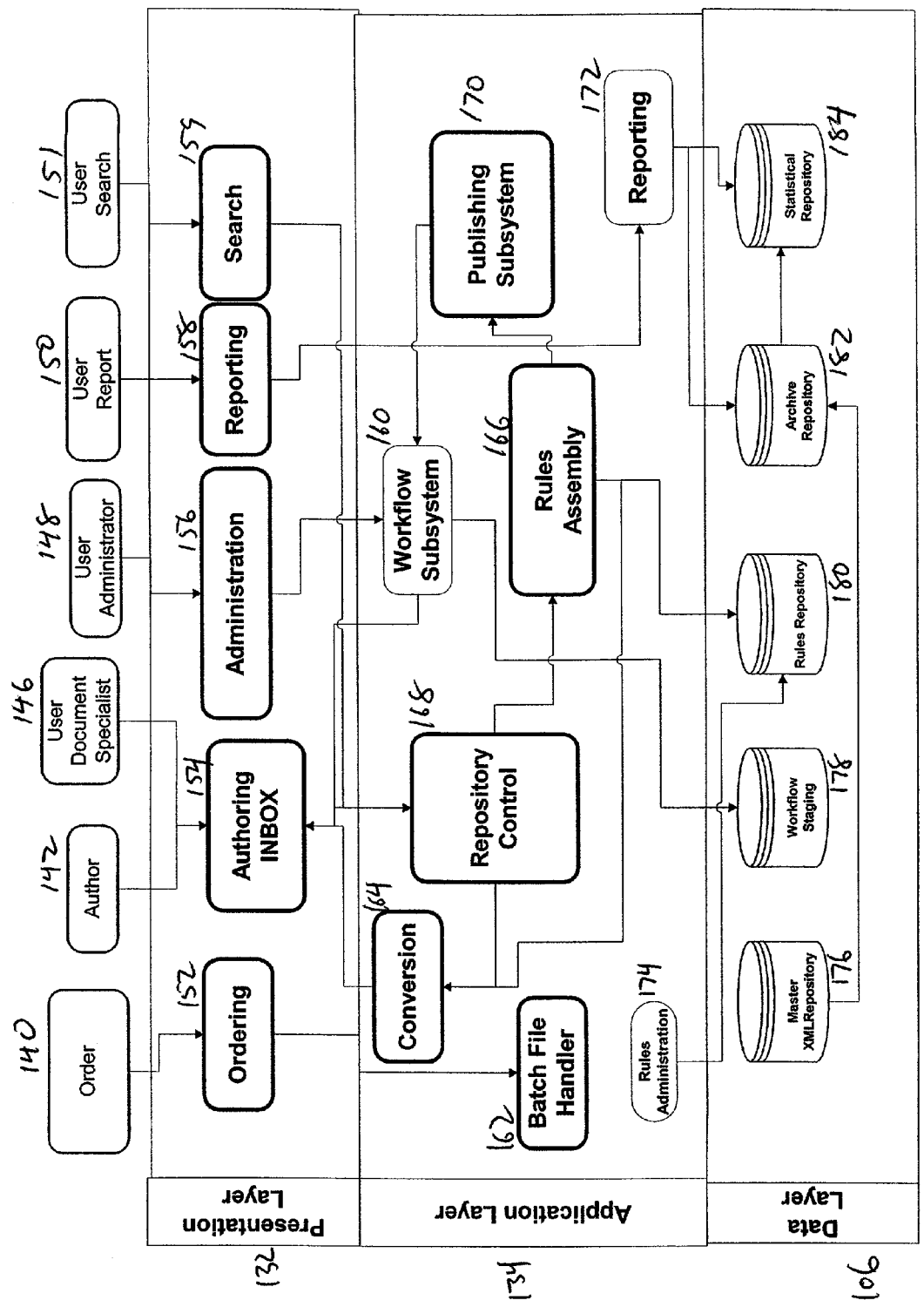
FIG. 2 is an example of an application architecture framework.

FIG. 2 is an example of an application architecture framework 130 of a preferred embodiment of the present invention. At its highest level, this preferred embodiment includes a presentation layer 132, an application layer 134 and a data layer 106, which is the one or more repositories in FIG. 1. The presentation layer 132 is a user interface subsystem that interfaces users with the application layer 134. The application layer 134 receives data from the data layer 106 and commands from the presentation layer 132. Users may include an author 142, a document specialist 146, administrative users 148, users 150 reviewing reporting data, users 151 searching for components or documents and users who order documents 140 to production. An author 142 creates new components and may edit existing components. A document specialist 146 has specific knowledge of document languages, e.g., XML. Document specialists 146 may provide direct XML editing and tagging, as well as DTD development and maintenance. An administrative user 148 may add users, modify user profiles, create user security profiles, create workflow projects and modify workflow templates. It is understood that the same individual may act in each of these capacities depending upon the user's particular action.

The presentation layer 132 or, User Interface Subsystem, translates screen level user requests into application level objects that are forwarded to the application layer 134 for transaction processing. The User Interface Subsystem 132 also responds to user requests, formatting and displaying screen level results from the application layer 134. Preferably, there are five major work processes in subsystems in the User Interface Subsystem 132. These five major processes are an ordering process 152, an authoring process 154, an administration process 156, a reporting process 158 and a searching process 159. All work processes are accessible through a browser-based GUI. The browser-based GUI may use Java Server Pages (JSP) for presentation.

The application layer 134 contains the document application subsystems, each running a document application process and, may include a batch file handler 162, a conversion subsystem 164, a rules assembly subsystem 166, the repository control subsystem 168, the publishing subsystem 170, the reporting subsystem 173 and the rules administration subsystem 174. The application layer 134 communicates with the data layer 106 through standard database calls. The data layer 106 passes data back to the presentation layer 132 through the application layer 134 using standard programming interface methods. In this example, the data layer 106 includes a Master XML repository 176, a workflow staging repository 178, a rules repository 180, an archive repository 182, and a statistical repository 184.

Figure 3:
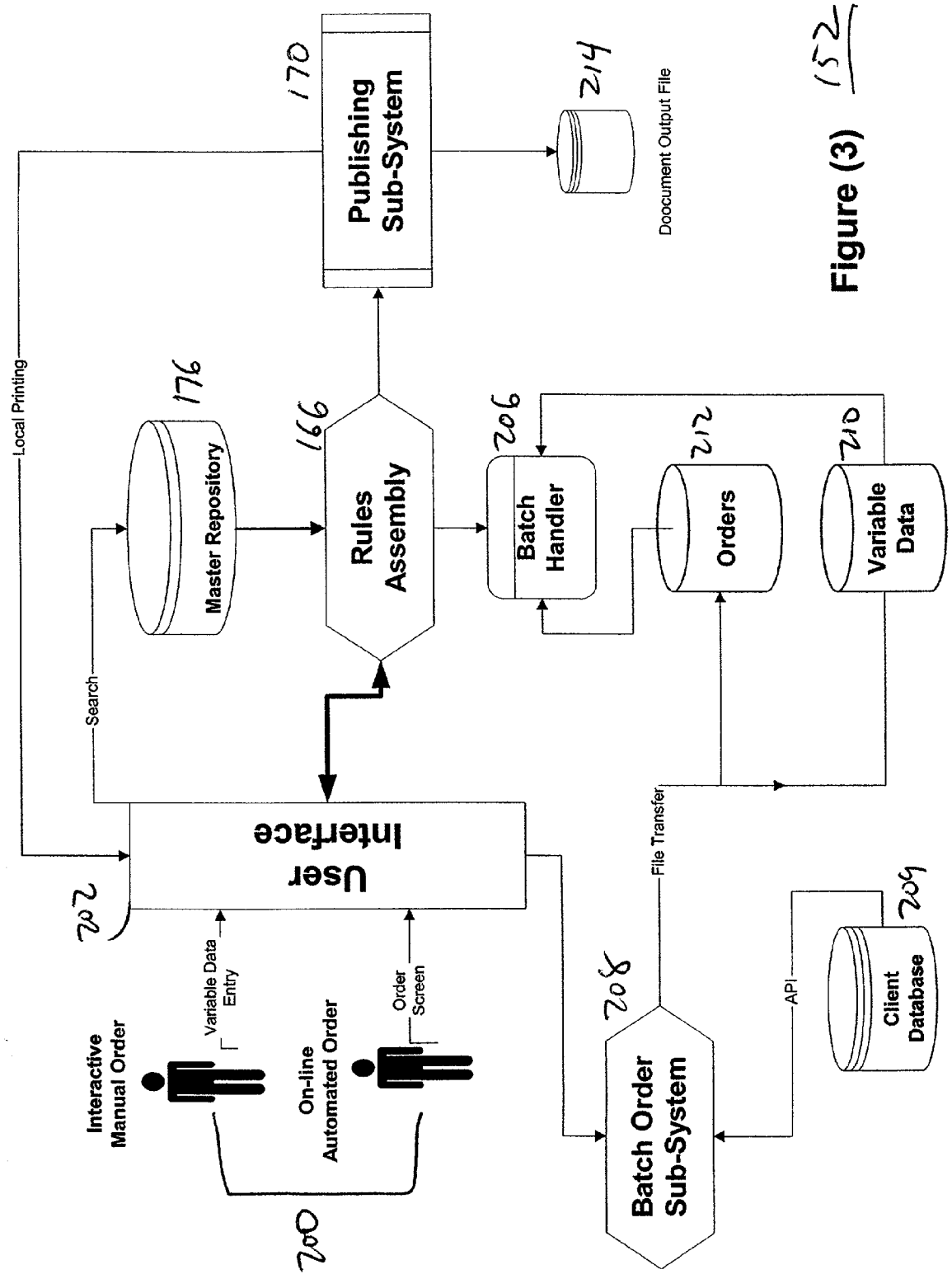
FIG. 3 is a flow diagram showing an example of three document ordering methods.

FIG. 3 is a flow diagram showing an example of the ordering process 152. Users 200 can order documents directly from a browser interface 202. Each order may be a manual data entry order 204 or an automated data entry order 206. Also, orders may be generated through automated system triggers in a batch process 208 via an application program interface (API) from an external database 208. An order file 212 linked with a variable data store 210 contains variable data associated with each order that is passed to the assembly subsystem 166 for insertion in the document for publication by the publishing subsystem 170.

Using the browser-interface 202, the user 200 may provide packaging instructions, and provide variable data. A user 200 places a document order by selecting the document using a document repository search screen in the browser interface 202, e.g., from a terminal. Document search results are returned through the browser interface 202, allowing the user 200 to view each full document using a word processor and, if desired, order the full document being viewed. When ordering a document, the user 200 may select to enter data manually 204 or for automated data entry 206.

If the user 200 selects manual data entry 204, the browser interface 202 prompts the user 200 to enter all variable data required for the document. Optionally, users 200 may place orders where variable data is provided via a client supplied variable data file 210. Additionally, orders may be generated through automated system triggers in a batch process 208 via an interface from an external database. The batch file handler 162 pulls order information from the order file 212 and the associated variable data from the variable data store 210 and invokes the assembly subsystem 166 to assemble the document. Once assembled, depending upon the type of output requested, the file is directed to the publishing unit 170 and to the output file 214 in the selected format.

Figure 4:
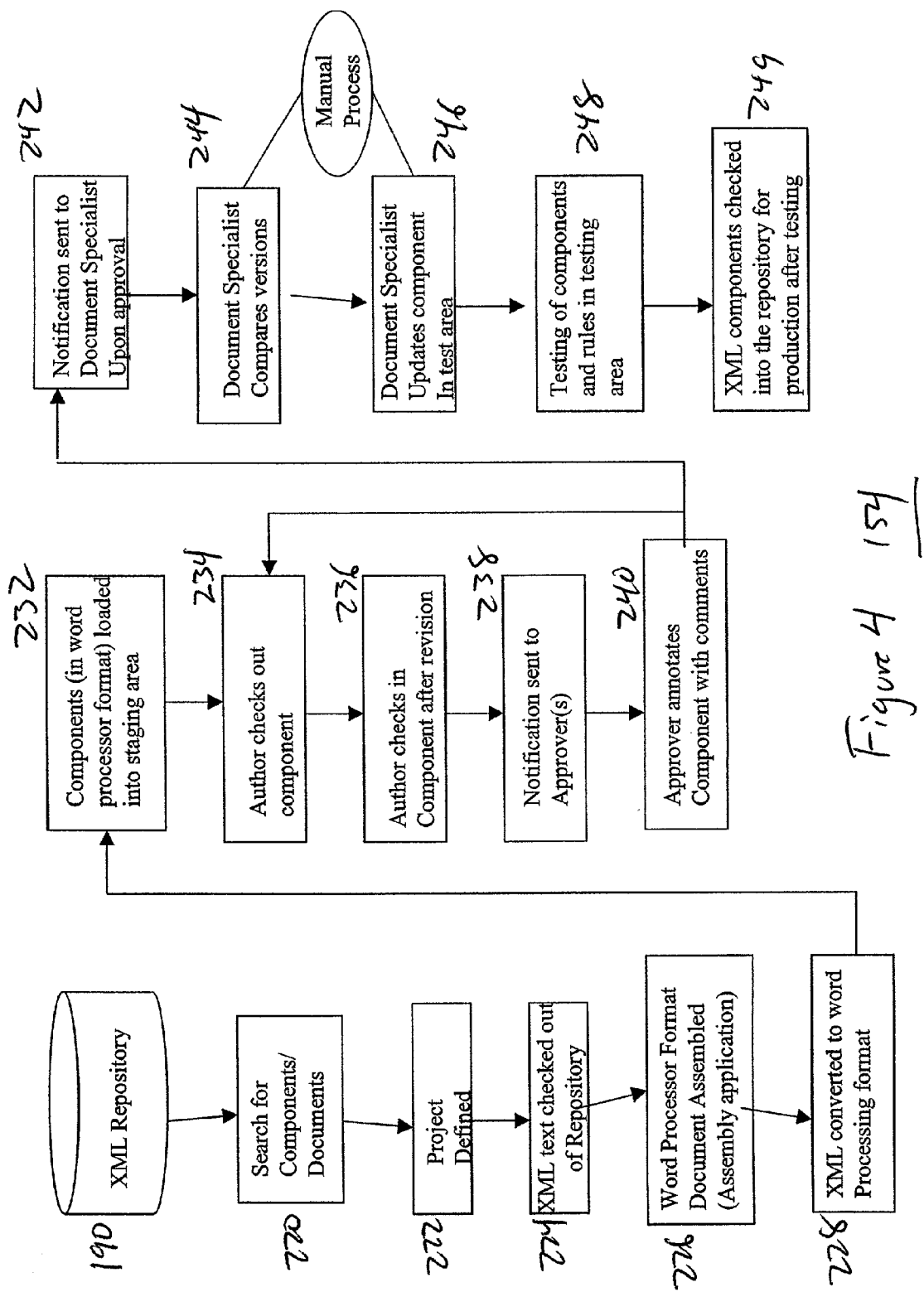
FIG. 4 is a flow diagram showing an example of a preferred authoring process, wherein users (authors) edit, review and approve existing or new documents or text through a Browser-Based Interface in a workflow controlled process.

FIG. 4 is a flow diagram showing an example of an authoring process wherein users (authors) edit existing or create new documents or components through a browser based interface. All previously created document components are stored in the master (XML) repository 176. Typically, a user initiates each project, setting it up and selecting an appropriate workflow process template for the document/component requested for editing. A user with the appropriate permission may search the repository for a document or a component. When a user searches for a component, the system allows the user to view a list of all documents of which the selected component is a part. Likewise, when a user searches for a document, the system allows the user to view a list of all components that are contained within the selected document. One option available to the user is to create a new project and assign a document or component to the new project. Each project is created by selecting a workflow template and assigning a project name. If applicable, users are added to the project as determined by the workflow template. After the project is created, selected components are locked in the master XML repository 176 to prevent another user from editing them. The workflow staging repository 178 contains text that is currently within a workflow project. Authors can check out and edit each document/component for which they have been assigned within the workflow template. Once a file is checked out for editing, the repository control subsystem 168 manages the document/component, tracking changes and versions. Changes are reviewed and approved by designated approvers in accordance with the applicable workflow template and, once approved, the approved document/component is sent to production update.

So, first in step 220, the user selects the document/component to be edited or authored and, in step 222 sets up the project. The component(s) are checked out of the master XML repository in step 224 and locked for version integrity from other projects that might require changing the same document/component. Whenever a document is checked out that includes a previously locked component, the previously locked component is provided read-only to the author. If a component is selected for editing in step 226, it is passed directly from the repository through the conversion subsystem, which converts it to a word processor file format and then, makes it available to the project for editing. If a document is selected, the assembly subsystem creates the document, and in step 228 passes the XML document file to the conversion subsystem, which converts the XML document to a word processor format file and includes the converted document in the project. In step 230 the word processor file is stored in the workflow staging repository 178 for subsequent editing. Authors are then notified and the project is placed in a user inbox in step 232.

Designated authors may check out (i.e., download a local copy) word processor formatted documents/components for their assigned project in step 234 through the browser-based interface. Each local document or component is editable using an appropriate word processor. Upon completing any edits, in step 236 the edited local document/component is checked back into the workflow staging repository 178 (uploaded) for subsequent workflow processing. Next, in step 238 the project is forwarded to the next designated workflow step for approval as determined by the selected workflow template. In step 240, the approver, reviews the document/component and either sends it back to the author for additional editing or approves the edited document/component. The final state of each approved document/component are passed to a document specialist user in step 242.

In step 244 the document specialist identifies each component that has changed in the project. In step 246 revised XML components are mapped to appropriate Document Type Definitions (DTD) and/or schemas and style specifications which identifies any further modifications that may be necessary as a result of text revisions. If any are identified, the document specialist implements such modifications. In step 248 the document, DTD and style sheet are loaded into a testing area where the document is tested to verify the document integrity. A "proof" document (such as a PDF file) is returned to a workflow designated user for approval. After the user approves the proof, in step 249 the document specialist checks the XML components into the Master XML Repository and updates the production database. Preferably, document specialists convert word processor files to XML and use an XML editor to modify XML component text and tags.

Users with administrative permissions can access the functions within the presentation layer 132 and perform administration tasks such as creating/adding and modifying user profiles, user permissions, administering security, create and modify workflow templates and projects, etc.

Using the browser-based interface, the reporting work process 158 allows users to view standard reports. A user may choose any or all of the available standard reports from a predefined list and print the selected reports or view them online in a viewable format (e.g., HTML or PDF). State of the art report generation tools generate the reports which may be sent to the user as email. Optionally, custom reports may be generated in response to particular user requests.

The repository control subsystem 168 stores and manages all data including XML components, constructed viewable document instances, request and variable data and workflow data. Each repository 176, 178, 180, 182, 184 can be queried in a number of ways and by a variety of users. For example, standard and ad-hoc reports can be developed from data in the repositories 178 and 184 using a predetermined set of attributes. User queries (e.g., by customer service and support) may include viewing existing documents (e.g., in PDF format) through the browser-based interface.

The assembly subsystem 166 of FIG. 2 assembles approved document components into completed XML format documents. The assembly subsystem 166 accepts all document order requests, whether submitted by users using the browser-based interface or received as document batch orders from the batch handler subsystem 162. The assembly subsystem 166 assembles document components according to predefined assembly rules and inserts or deletes the unique variable text and, then, inserts data from variable data files in response to tagged attributes of the specified XML components. After the document is complete with the appropriate text and data, the assembly subsystem 166 forwards the specific XML files to the publishing subsystem 170, which applies a style specifications to the assembled XML document components and, publishes XML files into a formatted document, as specified in the particular order.

The assembly subsystem 166 uses assembly rules from the rules repository to determine which document components are necessary for any particular type of requested document and to guide component retrieval from the component repository. Assembly rules are external to the component repository and dictate how the assembly subsystem 166 assembles components from a base document, determines how rules are applied for each component, to variable text and to variable data. Style specifications in the publishing subsystem dictate document style.

The Publishing Subsystem 170 is an integrated, commercially available package, such as XML Professional Publisher from XyEnterprise Solutions, Inc., for example. The publishing subsystem 170 creates individual output files from the previously assembled XML file by applying predefined style specifications. Each document is linked with output instructions in a job file, such as directing that the document be sent to a fulfillment center or to a web content management system directory. The publishing subsystem 170 manages output production to a variety of industry standard formats including postscript, PDF, HTML and metacode.

Figure 5:
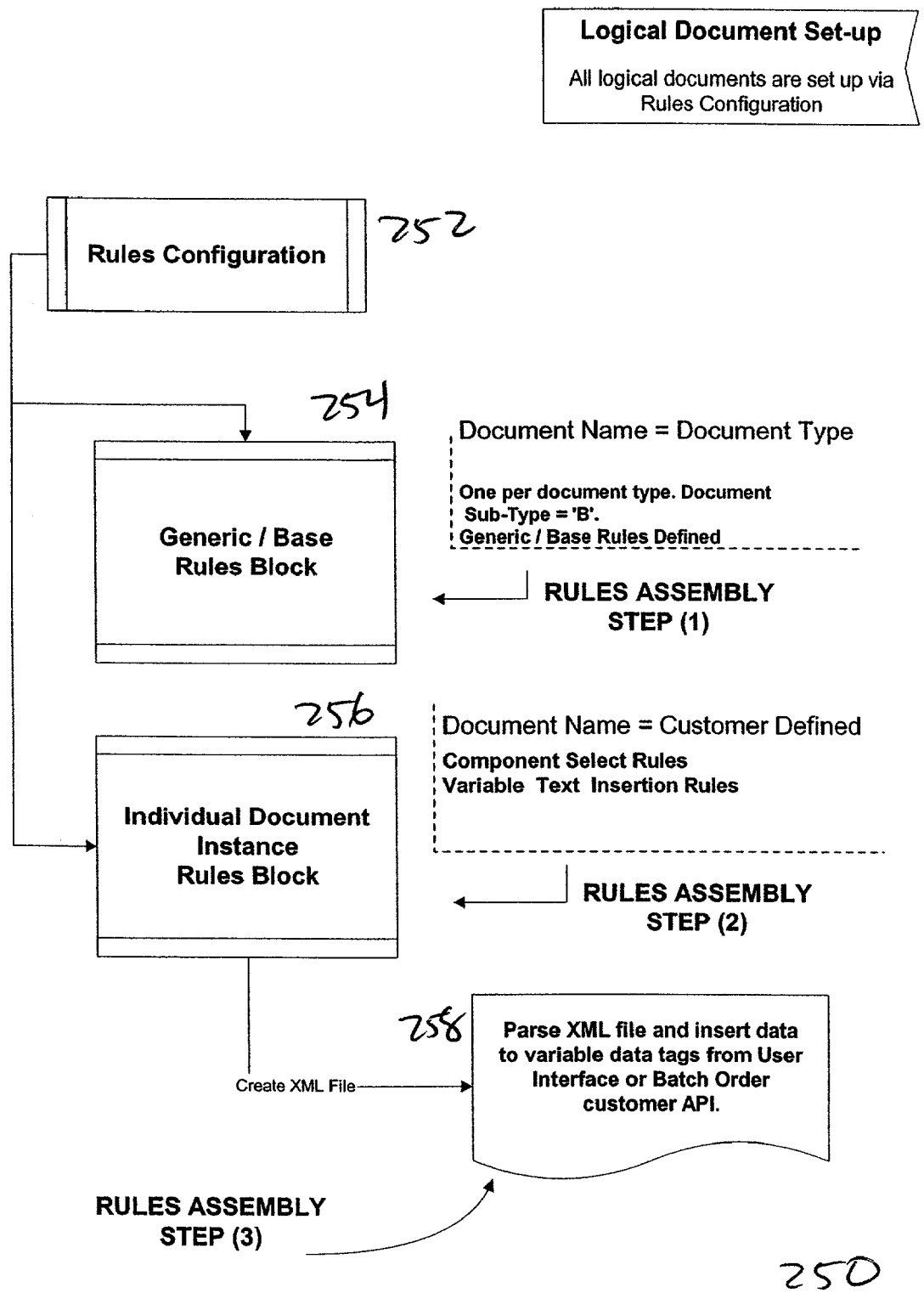
FIG. 5 is a flow diagram showing an example of rules selection.

FIG. 5 is a flow diagram 250 showing the process for the rules assembly from document order to the hand-off to the publishing subsystem of the completed XML files according to a preferred embodiment of the present invention. Business rules may be classified as Document/Group (kitting and packaging) rules, Base Document Selection rules, Component Selection rules and Variable Text Insertion rules. Each specific document instance available for order has a rules block associated with it. So, once the system receives an order in step 254, the assembly subsystem selects the applicable rules block for the ordered document using the associated document type. Each rules block is a concatenated key beginning with a generic document type that is followed by business layer information and logical links to other rules.

FIGS. 6A–C show examples of Document rules 300, Condition Selection rules 302 and Variable Text Selection rules 304. As can be seen from these examples 300, 302, 304, rules are structured such that conditions associated with one rule select the next rule to be processed. As each rule is processed, various parts of a particular document are added, removed, modified or otherwise altered, e.g., variable text is inserted at one appropriate location and boilerplate text is deleted from another. During rules assembly Boolean operators, that may be part of a logical function spread across multiple rules or located in a single rule, are collected and guide how the document is assembled when the various parts are processed. Document rules 300 are an example of a typical rules block selected in step 254.

So, selection of the document rules in step 254 may select other, subsequent rules, condition rules and variable text rules. How or whether each of those selected rules are processed may depend upon conditional evaluation results, variable text or components, or upon which rules were selected. Thus, selecting a set of document rules selects a Boolean logic tree-like structure wherein each branch must be evaluated until the end is reached, i.e., when the document is complete.

Document rules may contain multiple business layers that provide the ability to organize all content and business rules in a client specified set of business layers. In the example of FIG. 6A, eight business layers are available per client, although fewer or more layers may be included. Business layers have a hierarchical structure wherein each layer after the first is a subset of the previous layer. Naming conventions for each layer are client-by-client configurable with an unlimited number of options within each layer. Users are not required to use all layers and may use less than all layers by classifying the remaining as null, e.g., as for layers 4–8 in rules block 300.

Business layers are used for security, reporting, searching and indexing rules blocks for document assembly. Security is on a layer-by-layer basis, i.e., giving users read/write and other access to documents only within certain specific business layers. Reporting also may be available on a per layer basis. In addition, layer information may be used for document searching, when using search criteria other than specific document name searching. So, for example, a set of business layers for XYZ Health Insurance Company, Inc. might have the form:

Layer 1—Company Name (examples—XYZ of Virginia, Inc., XYZ of Maryland, Inc.).
Layer 2—Product (examples—HMO, PPO, POS)
Layer 3—Region (examples—Southeast, Northeast)
Layer 4—State (examples—Virginia, New York)
Layer 5—Customer Name (Microsoft, IBM, General Electric)
Layer 6—null
Layer 7—null
Layer 8—null All applicable business layer values are concatenated with document type to define all of the relevant actions and conditions that apply to a specific document assembly request for a specific document instance. All rules blocks stored within system are indexed by concatenated document type and specific business layer values.

So, returning to step 256 of FIG. 5, the assembly subsystem retrieves and assembles the XML document components from the repository in the order specified by the rules. The base/generic document is generated as an XML file for the particular ordered document, e.g., rule 306 with Rule ID 100. This XML file represents the application of the base document select rules. Normally, the base document select rules guide document component insertion, only inserting components that form the base document, i.e., do not delete or replace text.

In the next assembly step 258 the component select rules (e.g., the rules 308, 310, 312, 314 with RuleIDs 200, 201, 202, 205) are applied to the base document. These component select rules 308, 310, 312, 314 are applied sequentially through the rules table as a double linked list. Each component select rule 308, 310, 312, 314 may be classified according to any of three rules classifications. First each rule is classified according to the rule itself; Second, rules may be classified according to any conditions associated with applying the particular rule, e.g., AND, OR, etc.; Third, rules may be classified by specific actions that are taken if the particular rule's condition(s) are true—no action is taken in the event that any applicable rule condition is not true. Component select rules 308, 310, 312, 314 govern insertion or deletion of complete document components into the applicable document. Each "true" condition may elicit any one of three specific actions against the relevant document component. A new document component will be inserted from the repository directly after the affected component. The affected component may be replaced with a different component from the repository. The component select rules 308, 310, 312, 314 are applied to the XML file in step 260 as to make any necessary modifications. Optionally, variable text rules 316, 318, 320, 322, 324 may be included to govern insertion of text into specified tagged areas within document components. So, component select rules 308, 310, 312, 314 must be completely processed before any variable text rules 316, 318, 320, 322, 324 can be applied to a document.

A component select rule 308, 310, 312, 314 may be applied unconditionally, i.e., "always true" such that there are no conditions associated with the unconditional or always true rule. As a result, an always true rule is applied each time it is encountered. If a rule is not always true, it is conditional and must have at least one condition associated with it that must be evaluated. As each condition is evaluated, the entire condition set for the rule is evaluated, e.g., condition rules 326, 328, 330, 332, 334 for ConditionIDs 8211–8215 for component select rule 202. If any part of the condition is false, no action is taken with respect to that rule and rules assembly proceeds to the next rules set. Each condition may have one or more sub-conditions (and/or conditions) that are included in the rules evaluation, e.g., rule 328 (ConditionID 8212) is a sub-condition of condition 326 (ConditionID 8211). The rules evaluation process is repeated for each rules set until no sub-conditions exist for the particular rule identification. The assembly process follows strict Boolean logic rules to assemble the final document.

Variable text rules 316, 318, 320, 322, 324 are applied similarly to applying component select rules. However, variable text rules require only one action, inserting text at applicable tagged area of the XML file (as opposed to the three possible actions for component select rules), e.g., rules 336, 338, 340, 342, 344 having Action Ids 55256, 55258, 55262, 55264, 55266. A parsing program is run against the XML file to search for variable data tags, indicating variable data must be inserted into the documents. The variable data may be supplied either through the interactive publishing screen from within the system user interface or by a file sent through a client specific API. Each variable data tag within a document has a field name that matches an applicable field name in the variable data file, and is either supplied through the UI or sent through the API. Once the applicable variable data is inserted into the XML file, the complete XML file is forwarded to the publishing subsystem for publishing.

EXAMPLE

So, using the rule example of FIGS. 6A–C to assemble a document, COC-HMO.VA.BNI, having a document type COC, begins with Base Document Select Rules, selecting rule 306 with RuleID 100. In this example, there is one rule for default component selection for a certificate of coverage (COC) document type. From FIGS. 6A and 6C, there are 5 components 346, 348, 350, 352, 354 that are in the generic COC base document as identified for entries for this base rule 306. This is evaluated as:

1. If DocType=COC, insert components P0001, P0002, P0003, P0004, P0005.

From FIG. 6A, there are 3 component select rules for the HMO.VA.BNI specific version of the COC document from rules 308, 310, 312, 314 with RuleID 200, 201, 202, 205, they are as follows:

1. If Group=BNI Replace P001 with HMO.VA.BNI.P001.
2. If Group=BNI Replace P002 with HMO.VA.BNI.P002.
3. If ((Group=BNI and State=VA)) or ((Group=BNI and State=MD)), insert component P003L001 after P003 else insert component P003L002 after P003.

Also from FIG. 6A, there are 3 Variable Text select rules for the HMO.VA.BNI specific version of the COC document from rules 316, 318, 320, 322, 324 with RuleID 301, 305, 306, 308, 310. They are as follows:

1. If (Group=BNI) and (State=VA), replace variable text component "VT.CompanyName" with HMO.VA.BNI.VT0002.
2. If (Group=DMR) or ((Group=BNI) and (State=VA)), replace variable text component "VT.DoctorType" with HMO.VA.BNI.VT0005 else, replace variable text component "VT.DoctorType" with HMO.VA.BNI.VT0006
3. If (State=VA) or (State=PA), replace variable text component "VT.Dentist" with HMO.VA.BNI.VT0008 else, replace variable text component "VT.Dentist" with HMO.VA.BNI.VT0009.

So, from the above assembly rules, the document is COC-HMO.VA.BNI, where COC is DocType and HMO, VA and BNI are the three selected business layers used. The remaining business layers are classified as null. The 3 separate tables for the assembly process, Rules tables 300, Condition table 302 and Action table 304 are all linked with an applicable Rule ID. Document/Group rules are applied following Document Order to list of all the documents that need to be assembled for each particular Order. For this example, only one document is in the DocGroup.

Further, as noted above for this example, there is one rule for selection of default components for DocType=COC. Base Document Select rules are applied on this Certificate of Coverage (COC) document with 5 default components (identified by actions 346, 348, 350, 352, 354) in this base document, P0001, P0002, P0003, P0004 and P0005. The base document rules 306 is "always true," so condition table 302 is not reviewed for the base document rule 306 because the conditions for a rule that is always true are don't cares. Instead, rules assembly proceeds directly to the Action Table 304 which includes five actions, i.e., default actions 346, 348, 350, 352, 354 for Rule 100: action 346 identified by ActionID=56334 is marked as "First Action" to "Insert" COC-P0001. No components are listed as affected and each of four of the other subsequent actions that are linked by "Next Action" column.

In this example, there are three component selection rules for the document order "HMO.VA.BNI" as can be determined in Document rules 300 and Actions rules 304.

1). If State=VA and Group=BNI, Replace P001 with HMO.VA.BNI.P001.

Rule 308 (RuleID=200) is identified as the first to apply for this layer.

Always True=True, so this rule 308 is always true, the condition is not evaluated (i.e., a don't care) and the application proceeds directly to the Action Table 304.

The first action 346 (ActionID=56345) for this rule 308 is "Replace".

2). If Group=BNI Replace P002 with HMO.VA.BNI.P002.

In Rule 310 (RuleID=201) is identified as the first one to apply for this layer. Always True=True, so, this rule 310 is always true and the condition is not evaluated. Again, the application proceeds directly to the Action Table 304, where the first action 356 (ActionID=46743) for this rule is "Replace".

Rules are linked to other rules by entries in the "Next Rule" and "Previous Rule" columns. So, for this rule 310, the next rule is rule 312.

3). If ((Group=BNI and State=VA)) or ((Group=BNI and State=MD)), insert component P003L001 after P003 else insert component P003L002 after P003.

Rules 312, 314 (RuleIDs 202 and 205) are identified. Rule 312 is not marked always true and so conditions 326, 328, 330, 332, 334 (ConditionIDs 8211, 8212, 8214, 8213 and 8215) in Condition Table 302 must be evaluated. The first condition, 346 is identified by a "First Condition=True" entry.

Condition 346 is an "OR" type condition with both a sub-condition 348 and a next condition 352 identified. The sub-condition 348 is evaluated first and, then, the next condition 352 is evaluated. Sub-condition 348 is an "AND" type of condition with a Next Condition 350.

If Group≠BNI, then the next condition 350 is not evaluated, because the condition 348 is false. If condition 348 is false no action is taken with respect to the rule 312.

Instead, Next Condition 352 is evaluated.

If condition 348 is true, condition 352 is not evaluated for this is "OR" type condition.

So, the conditions can be included into the rules depending upon the relative complexity of the result.

The evaluation results of condition 352 depends upon condition 348. If condition 348 is true, then condition 352 is not evaluated and condition 346 is True.

If condition 348 is false then, condition 352 is evaluated in the same manner as condition 348. Both conditions 348 and 352 are AND conditions with different variable/values.

If Rule 312 is true, the action 356 (ActionID=45654) is an Insert.

If Rule 312 is false, then turning to ELSE Rule 314 which is always true, the indicated action 358 (ActionID=45655) is an Insert.

So, for this example, there are three Variable Text select rules for the HMO.VA.BNI specific version of the COC document. In each of these Variable Text select rules Variable Text is treated as component.

1). For first rule 316: If (Group=BNI) and (State=VA), replace variable text component "VT.CompanyName" with HMO.VA.BNI.VT0002.

The document COC-HMO.VA.BNI is being constructed so this rule 316 is always true for this example.

Skipping the condition to Action Table 304, the Action 360 for this Rule is Replace "VT.CompanyName" with VT0002.

2). The next Rule 318, is not always true and has an OR type of condition. If (Group=DMR) or ((Group=BNI) and (State=VA)), replace variable text component "VT.DoctorType" with VT0005; else, replace variable text component "VT.DoctorType" with VT0006.

The condition 362 (ConditionID=9235) includes sub-condition 364 and next condition 366. The sub-condition 364 is evaluated first.

Condition 364 is a normal AND type Boolean condition, both parts of which are true.

So, for this condition 364 the action 368 is Replace "VT.DoctorType" with specific variable text.

If the condition 364 is false for Rule 318; then, always true rule 320 indicates action 370 (ActionID=55262).

3). For third Variable Text Rule: If (State=VA) or (State=PA), replace variable text component "VT.Dentist" with VT0008; else, replace variable text component "VT.Dentist" with VT0009.

The condition for this rule 322 is entirely variable text with no layers involved and has a sub-rule 324.

If the condition for 322 is true, then executing action 372 for it, replaces "VT.Dentist" with VT0008.

If Rule 322 is false, The evaluating else 324, which is always true, leads to action 374 which replaces "VT.Dentist" with VT0009.

Rules blocks can also be used when the assembly subsystem interrogates data values in a variable data interface file produced from an external client database. This will allow users of the system to extend the power to the rules assembly process by providing an additional degree of granularity with respect to the assembly process.

Thus, a group of original personalized custom documents for each of a group of individuals is automatically assembled from numerous previously authored and periodically updated document components. All that is required to create such a group of documents is to provide user specific document rules and, optionally, variable text, which rules are evaluated, logically, to generate each personalized custom document.

Having thus described preferred embodiments of the present invention, various modifications and changes will occur to a person skilled in the art without departing from the spirit and scope of the invention. It is intended that all such variations and modifications fall within the scope of the appended claims. Examples and drawings are, accordingly, to be regarded as illustrative rather than restrictive.

What is claimed is:

1. A document component management system for automatically generating customized documents for a plurality of individuals, each customized document being customized according to an applicable set of rules, said document component management system comprising:

a presentation layer, users interfacing with said document component management system through said presentation layer;

a data layer containing a plurality of repositories, ones of said repositories storing document components and published documents in one or more formats;

and an application layer interfacing said presentation layer with said data layer to create and maintain document components, user requests entered at said presentation layer being fulfilled by said application layer, said application layer retrieving document components responsive to user requests and assembling documents therefrom, assembled documents being published to respective ones of a plurality of individuals, a copy of published documents being stored in said data layer, wherein the application layer issues database calls to the data and receives data from the data layer through an application program interface; and a batch file handler receiving batch order requests and automatically selecting variable data and document rules from said data layer responsive to received said batch order requests, documents being generated from selected variable data and rules.

2. A document component management system as in claim 1 wherein said batch file handler receives batch order requests from said presentation layer.

3. A document component management system as in claim 1 wherein said batch file handler receives batch order requests from an application program interface.

4. A document component management system as in claim 1 wherein the conversion unit further receives assembled documents from said application layer and passes received said assembled documents to the presentation layer.

5. A document component management system as in claim 1 wherein said repository unit further comprises a workflow unit managing document component creation and editing existing components.

6. A document component management system as in claim 1 wherein the application layer comprises:

a conversion unit receiving document components from said application layer and passing received said document components through to said presentation layer;

an assembly unit receiving document requests from said batch file handler, said assembly unit retrieving document specific data, document rules and document components from said data layer responsive to document requests, said assembly unit assembling documents responsive to said retrieved document rules;

a repository unit managing document components and published documents archived in said repositories in data layer; and a publishing unit publishing assembled documents to identified individuals.

7. A document component management system as in claim 1 wherein ones of said plurality of repositories contain document specific data, archival information and statistical data.

8. A document component management system as in claim 7 wherein said plurality of repositories include a variable data repository, rules repository, an XML component repository, a published document repository and a word processor workflow staging repository.

9. A document component management system as in claim 8 wherein a plurality of published documents are in portable document format (PDF).

10. A document component management system as in claim 1 wherein a user searching through components contained in said repositories is presented with a list of documents containing components identified in said search.

11. A document component management system as in claim 1 wherein a user searching through documents contained in said repositories is presented with a list of components contained in documents identified in said search.

* * * * *